(12) United States Patent
Bates (10) Patent No.: US 10,753,907 B2
(45) Date of Patent: Aug. 25, 2020

(54) NON-METALLIC PIPE LOCATOR

(71) Applicant: First Texas Products, LLC, El Paso, TX (US)

(72) Inventor: Aris Bates, Parma, MI (US)

(73) Assignee: Phinder LLC, Parma, MI (US)

( * ) Notice: Subject to any disclaimer, the term of this patent is extended or adjusted under 35 U.S.C. 154(b) by 55 days.

(21) Appl. No.: 16/096,395

(22) PCT Filed: Sep. 6, 2017

(86) PCT No.: PCT/US2017/050154
§ 371 (c)(1),
(2) Date: Oct. 25, 2018

(87) PCT Pub. No.: WO2018/048823
PCT Pub. Date: Mar. 15, 2018

(65) Prior Publication Data
US 2019/0137454 A1   May 9, 2019

Related U.S. Application Data

(60) Provisional application No. 62/383,664, filed on Sep. 6, 2016.

(51) Int. Cl.
*G01N 29/14* (2006.01)
*G01B 17/00* (2006.01)
(Continued)

(52) U.S. Cl.
CPC .............. *G01N 29/14* (2013.01); *E02F 9/245* (2013.01); *F16L 1/11* (2013.01); *G01B 17/00* (2013.01);
(Continued)

(58) Field of Classification Search
CPC .............. G01N 29/14; G01N 29/4436; G01N 29/2481; G01N 2291/015; G01S 5/18;
(Continued)

(56) References Cited

U.S. PATENT DOCUMENTS

| | | |
|---|---|---|
| 4,911,012 A | 3/1990 | Ziska |
| 5,036,497 A | 7/1991 | Heitman |

(Continued)

FOREIGN PATENT DOCUMENTS

| | | |
|---|---|---|
| CN | 204129236 U | 1/2015 |
| DE | 3305208 A1 | 8/1984 |

(Continued)

*Primary Examiner* — Farhana A Hoque
(74) *Attorney, Agent, or Firm* — Endurance Law Group PLC (57) ABSTRACT

A non-invasive method and system for reliably locating underground pipes, particularly non-metallic pipes. The invention uses portable seismic generator to direct seismic waves into the earth at a downrange sampling location suspected to overlie a buried section of pipe. The seismic waves are imbued with a distinctive attribute, such as a predetermined frequency or digital pulse. Upon encountering the pipe, seismic waves are efficiently converted to longitudinal waves which are conducted lengthwise along the pipe to an accessible region. A receiver coupled to the accessible region is tuned to detect vibrations that carry the distinctive attribute. The receiver wirelessly transmits data indicative of the intensity of detected vibrations to a remote communicator which may be attached directly to the seismic generator. By sampling several locations in near vicinity, the most probable location of the buried pipe can be deduced.

8 Claims, 9 Drawing Sheets

(51) Int. Cl.
| | |
|---|---|
| *G01S 3/80* | (2006.01) |
| *G01V 1/00* | (2006.01) |
| *G01N 29/24* | (2006.01) |
| *G01N 29/44* | (2006.01) |
| *G01S 5/18* | (2006.01) |
| *E02F 9/24* | (2006.01) |
| *F16L 1/11* | (2006.01) |
| *G01V 1/16* | (2006.01) |
| *G01V 1/047* | (2006.01) |
| *G01V 1/22* | (2006.01) |

(52) U.S. Cl.
CPC ..... *G01N 29/2481* (2013.01); *G01N 29/4436* (2013.01); *G01S 3/80* (2013.01); *G01S 5/18* (2013.01); *G01V 1/005* (2013.01); *G01N 2291/015* (2013.01); *G01V 1/047* (2013.01); *G01V 1/162* (2013.01); *G01V 1/22* (2013.01); *G01V 2210/121* (2013.01); *G01V 2210/1425* (2013.01); *G01V 2210/1429* (2013.01)

(58) Field of Classification Search
CPC .... G01S 3/80; F16L 1/11; E02F 9/245; G01B 17/00; G01V 2210/121; G01V 2210/1429; G01V 2210/1425; G01V 1/22; G01V 1/047; G01V 1/162; G01V 1/005
USPC .............................................. 324/326; 367/47
See application file for complete search history.

(56) References Cited

U.S. PATENT DOCUMENTS

| | | | |
|---|---|---|---|
| 5,127,267 A | 7/1992 | Huebler et al. | |
| 5,269,335 A | 12/1993 | Heitman | |
| 5,452,263 A | 9/1995 | Heitman | |
| 5,563,848 A | 10/1996 | Rogers et al. | |
| 5,974,881 A | 11/1999 | Donskoy et al. | |
| 6,003,376 A | 12/1999 | Burns et al. | |
| 6,267,000 B1 | 7/2001 | Harper et al. | |
| 6,415,666 B1 | 7/2002 | Donskoy et al. | |
| 6,536,553 B1* | 3/2003 | Scanlon | G01N 29/069 181/108 |
| 6,690,617 B2 | 2/2004 | Cribbs | |
| 2003/0198131 A1 | 10/2003 | Chandler | |
| 2010/0018312 A1* | 1/2010 | Kirkpatrick | G01V 1/001 73/592 |
| 2013/0286781 A1* | 10/2013 | Owen | G01V 1/284 367/47 |

FOREIGN PATENT DOCUMENTS

| | | |
|---|---|---|
| GB | 2310719 A | 9/1997 |
| JP | 60238777 S | 11/1985 |
| JP | H0196583 A | 4/1989 |
| WO | 9219988 A1 | 11/1992 |

\* cited by examiner

NON-METALLIC PIPE LOCATOR

CROSS REFERENCE TO RELATED APPLICATIONS

This application claims priority to Provisional Patent Application No. 62/383,664 filed Sep. 6, 2016, the entire disclosure of which is hereby incorporated by reference and relied upon.

BACKGROUND OF THE INVENTION

Field of the Invention

The invention relates generally to apparatus and methods for locating buried pipes, and more particularly to non-invasive apparatus and methods for locating non-metallic pipes.

Description of Related Art

Pipes may be used to transfer liquid and gaseous substances such as natural gas, water, sewer and liquid petroleum to name but a few. Often, these pipes are buried underground, usually at a depth below the local frost lines. Once buried, the pipes may be difficult locate in the future when needed for service, damage avoidance, leak detection, future continuation of the line, or other purpose. Prior to the 1960's, most such buried pipes were made of metals, clay or concrete. Electromagnetic devices and techniques are commonly used with great effectiveness and precision to locate buried metallic pipes. However, non-metallic pipes, like clay or concrete, were not locatable by traditional electromagnetic means.

In the 1960's the first plastic pipes were installed in large numbers by gas, water, and sewer companies. Plastic pipes, like the earlier clay and concrete pipes, are not locatable by traditional electromagnetic means. Naturally, there have been numerous attempts to find a reliable and repeatable method for locating non-conductive, non-metallic pipe. Unfortunately, available technologies have all fallen short of providing reliable, repeatable locating results, which qualities are required in this field of endeavor. Failure to accurately locate a buried pipe can result in lost work efficiency, property damage, and in some cases can put human lives in danger.

Current systems and methods used to locate buried pipes include Ground Penetrating Radar (GPR). GPR technology has been available commercially for decades. It is a reliable and repeatable technology in certain geographic areas, depending upon the soil type. General estimates suggest that GPR works well in approximately 30% of North America. For example, in sandy soil without rocks or clay deposits, GPR can reliably locate buried non-metallic pipes. However, in clay soils, high water tables, or mixed mediums of rock/clay/loam, GPR is not reliable or repeatable and leaves up to 70% of the subsurface utilities in North America un-locatable.

Magnetometer Locating is technology based on the Electromagnetic Field of the Earth and dependent upon the user's ability and their own personal electromagnetic field. Many professionals attest to the accuracy of these methods. Many more will emphatically state (and Science agrees) there is no basis for this "technology" which is sometimes also categorized with the practices of dowsing and witching.

Technologies are available that either tap or hammer the pipe directly or "hammer" the water in the pipe to cause sound waves. If a technician is hammering the pipe or valve, like the Seba RSP 3 available from Tracer Electronics LLC (Lebanon, Tenn.), the risk of damaging the structure is present, making this a questionable method. If a technician is using a "Water Hammer", like the Radiodetection RD 500 available from Radiodetection Ltd. (Bristol, UK), the sound waves created are actually pressure changes that can damage pipes. Older pipes and pipe fittings are a high risk with this technology, often causing leaks, dislodging internal corrosion and sediments, along with other potential risks. Another drawback to these methods is the ability of the sound being generated to travel significant distances down the pipe from the point of contact and the lack of ability of the sound being generated to penetrate through the earth to be detectable at the surface. The Applicant has observed that if a pipe is buried more than three feet (3 ft.) deep, the soil resistance makes locating the sound very difficult, if not impossible using these technologies.

Yet another approach to locating non-metallic pipe involves the introduction of a conductive wire or transmitter into the pipe. The wire or transmitter can be used to mark the pipe's location using a traditional electromagnetic locator. One example of this technology can be seen in PCT Patent Publication No. WO 9219988 Connel. These methods should not be used to locate potable water, due to rigid EPA rules concerning introducing a foreign object into drinking water. For non-potable water pipes (storm, sanitary, drains, etc.) the rules are not as stringent, but there are other factors that may make this undesirable. One practical drawback is the contamination or soiling of the wire snaked down the length of the pipe. Non-potable water pipes often contain disgusting sediments and residues that readily attach to the wire and must be removed and cleaned by the technician after the procedure is completed. Also, there are fittings and bends in the pipes that may not allow an object or wire to be pushed through or around these barriers. In larger diameter pipes, the wire or transmitter may not be able to push very far along its path due to the wire flexing. Thicker wire or cable will not bend around the fittings. Thin wire is almost impossible to push any appreciable distance in a large diameter pipe or conduit.

Two more recent technologies include the Inspector 007 from SubSurface Instruments (De Pere, Wis.) and the APL from Sensit Technologies (Valparaiso, Ind.). The Applicant has observed that these technologies tend to register unacceptably high instances of false positives. Hence, these newer technologies must be categorized as not sufficiently repeatable/reliable.

U.S. Pat. No. 4,911,012 to Ziska describes a method for locating underground pipes using vibrations introduced by hammering on an exposed portion of the pipe. A down-range sound detector is used to listen for the vibrations. A significant problem with this type of technique is the loss of signal strength. The down-range detector must be very sensitive to pick-up a signal, and is thus highly susceptible to false-positive indicators emanating from non-relevant sources. Also, because of the loss of signal strength issues, this technique is limited to relatively short-range use.

Figure 1:
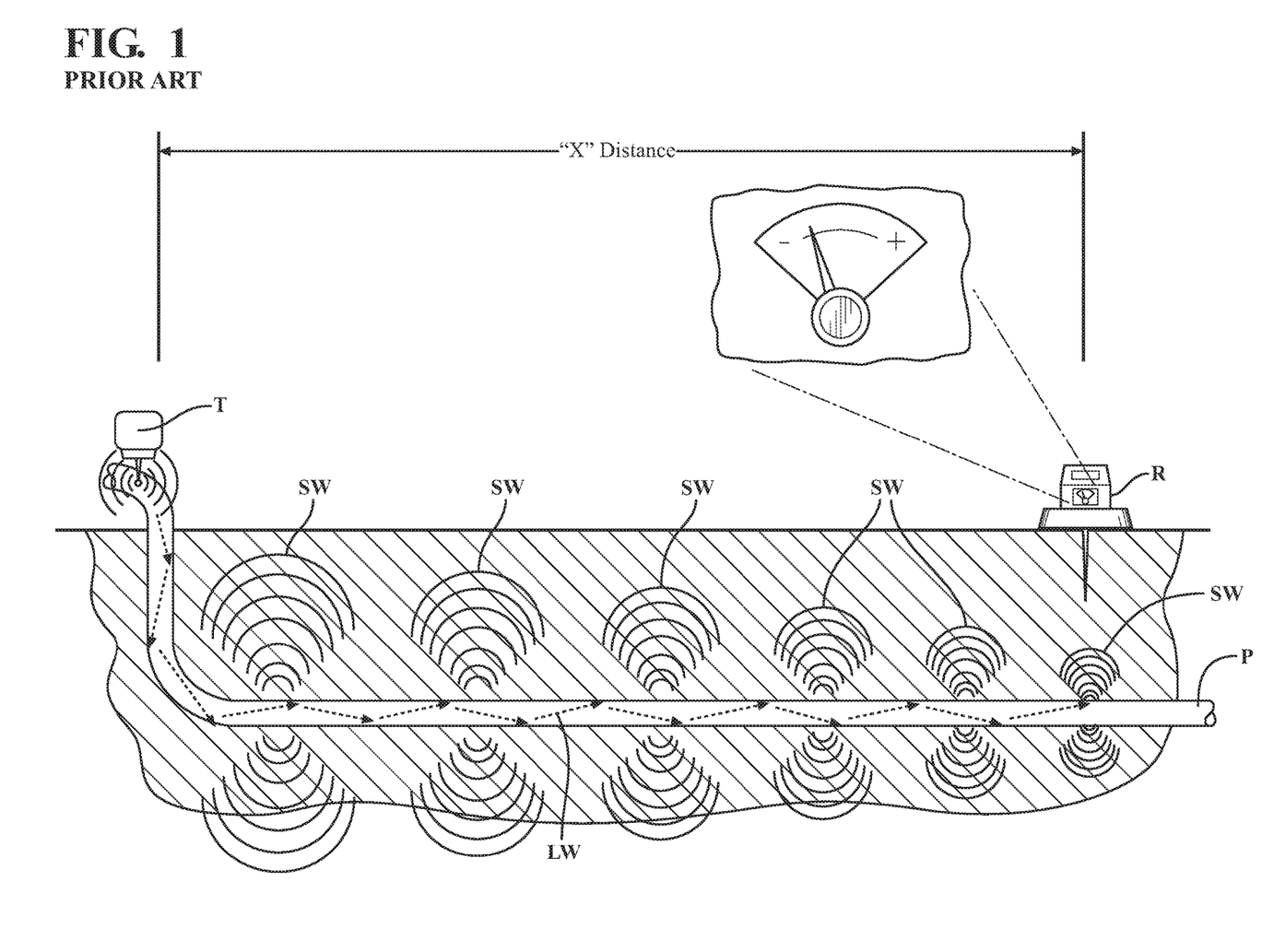
FIG. 1 is a highly simplified schematic view portraying a typical prior art method for locating buried pipes by attaching a vibration transmitter to an accessible region of the pipe and listening for emitted vibrations at a downrange location.

FIG. 1 is a highly simplified schematic view portraying a prior art method for locating buried pipes P by attaching a vibration transmitter T to an accessible region of the pipe P, and then attempting to listen for emitted vibrations with a receiver R at a downrange sampling location.

Accordingly, none of the currently available technologies and methods are able to locate buried non-metallic pipes with repeatable and reliable results. The failure to correctly locate a buried non-metallic pipe can pose serious risk to people and property, not to mention waste valuable time and work resources. For example, the failure to correctly locate a non-metallic pipe carrying a flammable gas can result in an explosion. The failure to correctly locate a buried non-metallic pipe carrying potable water can result in contamination to drinking water. There is therefore a need in the art for non-invasive systems and methods to repeatably and reliably locate buried non-conductive pipes, using relatively low-cost and easily transported equipment, in a time-efficient manner.

BRIEF SUMMARY OF THE INVENTION

According to a first aspect of the invention, a non-invasive method is provided for locating a remote section of a pipe buried in the earth. A receiver configured to detect the intensity of vibrations has at least one distinctive attribute is coupled to an accessible region of the pipe. A technician or operator selects a downrange sampling location that is suspected to overlie a remote buried section of the pipe. Seismic waves having an intensity and containing the distinctive attribute are then transmitted into the earth at the downrange sampling location. The seismic waves are converted into longitudinally propagating waves at an intercept point along the pipe nearest to the downrange sampling location. The longitudinal waves retain the distinctive attribute as they are conducted along the pipe toward the accessible region. The longitudinal waves, in turn, induce vibrations in the pipe that contain the distinctive attribute. Vibrations having the distinctive attribute are detected in the pipe with a receiver, which also measures the intensity of the detected vibrations. A signal is then transmitted from the receiver to a remote communicator that is configured to portray the intensity of the detected vibrations through at least one human sensory mode.

According to a second aspect of the invention, a non-invasive method for locating a remote section of a pipe buried in the earth. A receiver is coupled to an accessible region of the pipe. The receiver is configured to detect the intensity of vibrations that have at least one distinctive attribute. A technician or operator selects a first downrange sampling location which they suspect overlies a remote buried section of the pipe. Seismic waves containing the distinctive attribute at a predetermined intensity are then transmitted into the earth at the first downrange sampling location. These seismic waves are converted into first longitudinally propagating waves at an intercept point along the pipe nearest to the first downrange sampling location. The first longitudinal waves retain the distinctive attribute, as they are conducted along the pipe toward the accessible region. A second downrange sampling location is then selected by the technician which is spaced from the first downrange sampling location. Once again, seismic waves containing the distinctive attribute at the predetermined intensity are transmitted into the earth at the second downrange sampling location. The seismic waves are converted into second longitudinally propagating waves at an intercept point along the pipe nearest to the second downrange sampling location. The second longitudinal waves retain the distinctive attribute as they are conducted along the pipe toward the accessible region. Vibrations having the distinctive attribute are detected in the pipe with a receiver, which also measures the intensity of the detected vibrations. A signal is then relayed from the receiver to a remote communicator which is configured to portray the intensity of the detected vibrations through at least one human sensory mode. Finally, the technician compares the intensity value of the detected vibrations produced by the first longitudinal waves to the intensity value of the detected vibrations produced by the second longitudinal waves, and makes a determination that the downrange sampling location associated with the highest intensity value is closest to the pipe.

According to yet another aspect of the invention, a system is provided for locating buried pipes. The system includes a seismic generator that is configured to produce downwardly directed seismic waves in soil, the seismic wave having a distinctive attribute. The seismic generator includes a ground interface. A selector device is operatively coupled to the seismic generator and configured to modify the distinctive attribute. A receiver is configured to detect the intensity of vibrations. The receiver includes a coupling directly attachable to an accessible region of the pipe. The receiver includes a selector knob operable to alter the distinctive attribute detected by the receiver. A remote communicator configured to display the intensity of a detected vibration containing the distinctive attribute through at least one human sensory mode. The remote display includes an antenna configured to receive wireless signals from the receiver and portray the intensity of the detected vibrations through at least one human sensory mode. The remote display is operatively connected to the seismic generator.

The invention provides systems and methods with which a utility owner, an excavation contractor or a locating contractor can easily find buried pipes of all kinds, including but not limited to non-metallic types which have historically been difficult to locate. This invention provides a reliable, repeatable method and system that is easy to use and works on most types of pipes and generally regardless of contents or whether the pipe is under pressure. The methods and system of this invention do not require access to the inside of the pipe, thereby enabling location of pipes carrying pressurized gas and water without endangering the technician or disrupting service to customers connected to the pipe.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Referring to the figures, wherein like numerals indicate like or corresponding parts throughout the several views, the invention is shown in various alternative configurations implementing a novel system and a non-invasive method for locating a remote section of a pipe 20 buried in the earth 22. Based on several data points collected through empirical samplings, a skilled operator can accurately predict the location and path of an underground buried pipe 20 without exposing the pipe's contents to external contamination. The principles of this invention can be applied to locate pipes 20 of all types and compositions, including but not limited to gas pipes, water pipes, sewer pipes, drain pipes, pipes under pressure and not under pressure, pipes made of PVC (and other formulations of plastic), clay, concrete (including but not limited to asbestos concrete, PCCP, and the like), cast iron, steel, copper, aluminum, and other metals. In the most common implementations, the invention is suited to locate pipes 20 of the type having an elongated tubular wall and a hollow fluid-carrying interior. However, it is contemplated that the principles of this invention could be applied to locating tubular conduits and chases for non-fluid carrying applications such as electrical and/or fiber-optic wire casings. Indeed, many other applications may also be possible without departing from the spirit of this invention as described herein. Those of skill in the art will readily appreciate that the novel system and a non-invasive method of this invention are particularly well-suited to locating non-metallic pipes 20 which have heretofore been the most difficult to locate using prior art methods.

Figure 2:
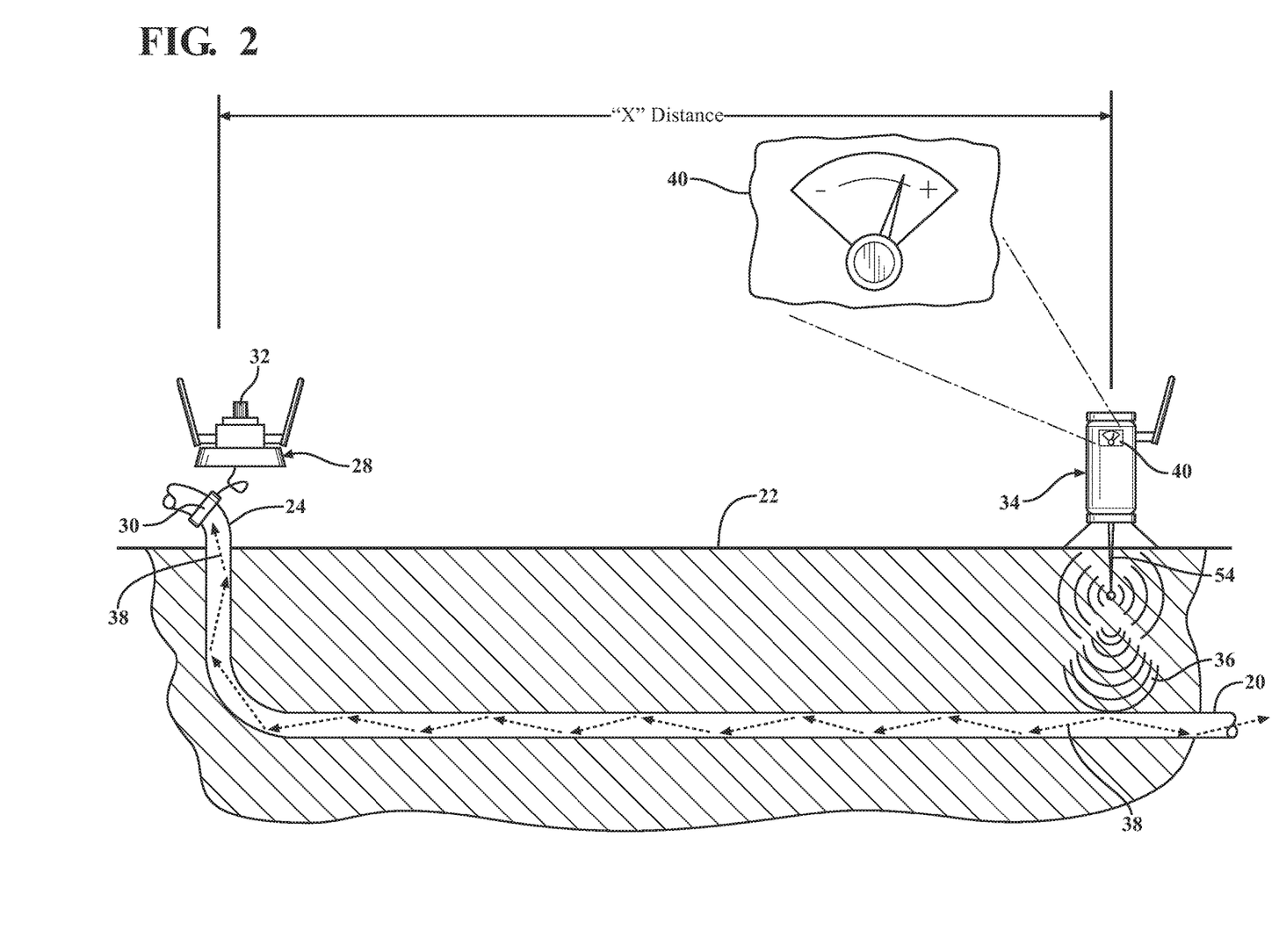
FIG. 2 is a schematic view comparable to FIG. 1, but showing a system and method according to a first embodiment of the present invention.

Turning now to FIG. 2, the present invention is shown in a highly simplified schematic form wherein a substantial length of the pipe 20 is buried below the surface of the earth 22. An accessible region 24 of the pipe 20 is shown here in the form of an above-ground exposed elbow. In other examples, the accessible region 24 could be exposed through a man-hole 26 (FIG. 3) or other type of access port. In practice, the accessible region 24 can be any suitable exposed surface of the pipe 20. The pipe 20 in these examples is described in the exemplary form of a fluid-conducting conduit, such as for carrying water, natural gas or the like.

A receiver 28 is coupled to the accessible region 24 of the pipe 20. The coupling 30 may be any suitable type, such as a clamping device that is tightly affixed to an exterior surface of the pipe 20 via spring or screw pressure, magnet, adhesive, or the like. The receiver 28 is configured to detect the intensity of vibrations having at least one distinctive attribute. Distinctive attributes can include, but are not limited to, such things as a defined frequency, a narrow frequency range, specified combinations of frequencies or frequency ranges, embedded digital signals (e.g., a pattern of pulses and pauses), tonal combinations, and the like. The receiver 28 can take many different forms. In one contemplated example, the receiver 28 is a highly sensitive piezoelectric sensor of the type that uses the piezoelectric effect to measure changes in pressure, acceleration, strain, or force by converting the measured change to an electrical charge. Those of skill in the art may envision a receiver based on alternative technologies, such as geophone, hydrophone, lace sensor, microphone and seismometer to name but a few of the many options. Indeed, the receiver 28 may take many different forms and may operate on any one or more different technology platforms to achieve the purposes of this invention.

The receiver 28 is configured to differentiate or distinguish vibrations containing the distinctive attribute from vibrations that do not contain the distinctive attribute. And preferably, the receiver 28 is equipped to be adjustable or tunable with respect to one distinctive attribute from among a selection of different attribute options. For illustrative purposes, a selector knob 32 is shown on the top of the transmitter 28 to represent the ability to selectively differentiate or distinguish vibrations containing only one distinctive attribute. For example, if the distinctive attribute is a specified frequency or frequency range, the selector knob 32 can be manipulated to change reception to a different frequency or range, somewhat akin to tuning a radio to a different AM or FM station. Or in the example of embedded digital pulses (e.g., 1-1-0-1-1-0 . . . ), the selector knob 32 can be manipulated to change to a different digital signal (e.g., 1-1-1-0-0-1-1-1-0-0 . . . ). Thus, when environmental conditions dictate, the receiver 28 can be tuned to respond to a different distinctive attribute. As but one example, if the receiver 28 is initially set to respond to vibrations in the range of 10-15 Hz, but a nearby source of noise pollution is producing signals in the 10-15 Hz range, the selector knob 32 can be manipulated to re-tune the receiver 28 to a different frequency range—say 900-915 Hz for example. In this manner, the ambient noise pollution will not adversely influence the receiver 28 detections. It should be recognized that the depicted selector knob 32 is merely a representation for any suitable control device. Alternative contemplated examples include push buttons and touch screen interfaces, to name but two.

The receiver 28 is configured with wireless transmission capability to transfer information concerning the intensity of vibrations detected through the coupling 30, 30' having the predetermined distinctive attribute. Any suitable wireless technology can be used, including but not limited to radio waves, light, magnetics, electric fields, sound energy and the like. Examples of suitable wireless technologies include, but are not limited to, Wi-Fi and Bluetooth protocols. Antennae located on the sides of the receiver 28 are indicative of its wireless transmission capability.

Figure 4:
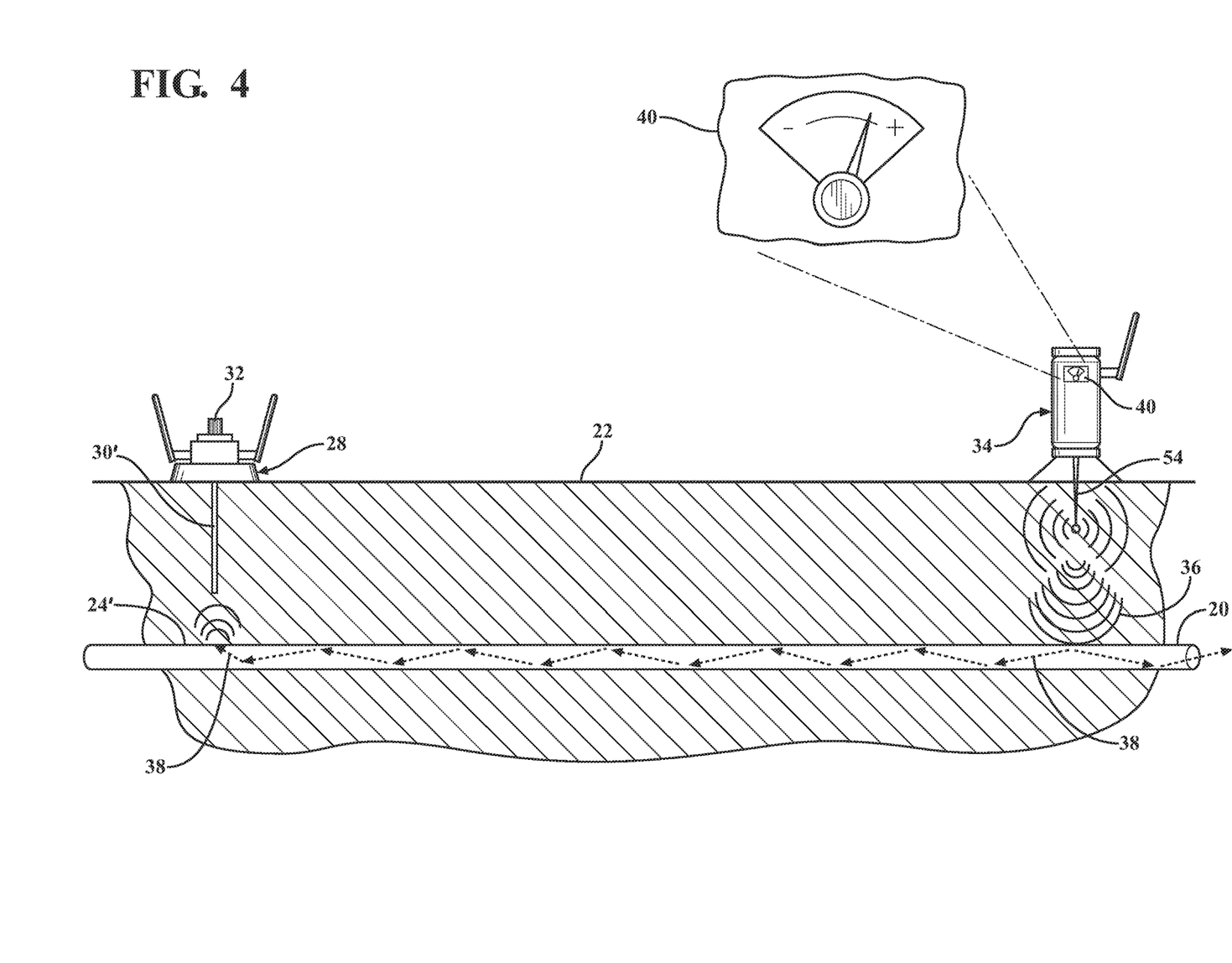
FIG. 4 is a schematic view as in FIG. 2, but showing yet another alternative configuration wherein the receiver is coupled to the accessible region of the pipe through a ground spike.

FIG. 4 represents a possible, although not ideal, arrangement wherein an accessible region 24' of the pipe 20 is known with a high degree of certainty but not directly physically accessible. For example, the accessible region 24' may constitute a verified underground location of pipe 20. In these cases, where direct physical access to the accessible region 24' is not possible, the coupling 30' for the receiver 28 may be configured in the form of a ground spike that is driven in the ground directly above, or as close as possible, to the accessible region 24'. In another alternative embodiment, the non-contact coupling 30' for the receiver 28 may be configured in the form of a plate (not shown) for listening on the surface. The specific type of coupling 30, 30' used will of course depend upon the site requirements.

As previously stated, the purpose of this invention is to map the location of buried pipes 20 that extend along unknown mysterious underground paths. Usually, this assessment is made over a wide geographic area and sometimes harsh/varied terrain. After the coupling 30, 30' has been secured and the receiver 28 tuned for sensitivity to the specified distinctive attribute, and the receiver 28 is activated to broadcast detection values wirelessly, the technician (i.e., operator or user) will then make an educated guess as to the underground path along which the target pipe 20 lays hidden. The technician selects a first downrange sampling location which is located a distance away from the accessible region 24. That is to say, the first downrange sampling location is initially chosen because the technician suspects it to overlie a remote buried section of the pipe 20. In FIG. 2, the distance between accessible region 24 and the first downrange sampling location is labeled "X." For instance, one might image that X≈20 yards, or 50 yards, or 75 yards, or more. The local conditions and the technician's confidence in predicting the likely underground path of the pipe 20 will determine what X distance should be for any given situation.

Next, the technician temporarily locates a seismic generator 34 at the first downrange sampling location. The seismic generator 34 is configured to produce propagating seismic waves 36 containing a distinctive attribute recognizable by the receiver 28 and having a specified intensity. Seismic waves 36 suitable to this invention can be produced by various methods, including but not limited to a loud speaker, a transducer, an accelerated hammer, a Vibroseis machine (i.e., a specially-adapted device for injecting low-frequency vibrations into the earth) or any other system capable of producing earth-penetrating sounds and/or vibrations containing a distinctive attribute recognizable by the receiver 28. The seismic waves 36 thus generated travel through the earth 22, carrying therein the distinctive attribute, with the hope of reaching the target buried pipe 20 before suffering too great energy loss. It is believed that the seismic generator 34 will produce seismic waves 36 that propagate in a downwardly-directed conical or semispherical shape. The immediate (local) conditions of the earth 22 will have a substantial impact on the transmissive properties of the seismic waves 36. For example, loose sandy soil will have different wave attenuation characteristics than, say, hard-packed clay or saturated top soil.

When the buried pipe 20 is located relatively near to the first downrange sampling location and sufficient initial intensity is imparted to the generated seismic waves 36, some fraction of the seismic waves 36 will reach the pipe 20, intersecting its wall nearest to the first downrange sampling location which may be identified as an intercept point. It is presumed that most of the initial energy in the seismic waves 36 will be absorbed by the soil medium before reaching the pipe 20. Said another way, the intensity of the seismic waves 36 that reach the pipe 20 depend most significantly on the initial energy or intensity of the seismic waves 36, the density and/or transmissive properties of the material (earth 22) through which the seismic waves 36 travel, and of course the underground distance over which the seismic waves 36 must travel to reach the intercept point of the pipe 20.

Seismic waves 36 that reach the pipe 20 are converted to longitudinal waves 38 that propagate along the length of the pipe 20 in opposite directions from the intercept point. These longitudinal waves 38 retain the distinctive attribute (e.g., specified frequency or digital signature, etc.). However, unlike the highly dampened transit of seismic waves 36 through the earth 22, the longitudinal waves travel rapidly along the wall of the pipe 20, echoing and reflecting through the hollow interior of the pipe 20, and can also travel in any fluid medium that may be occupying the hollow interior of the pipe 20. The longitudinal waves 38 traveling in one direction are conducted along the pipe 20 directly toward the accessible region 24 where the receiver 28 is waiting to detect a vibration having the distinctive attribute.

Vibrations produced by the longitudinal waves 38 that reach the coupling 30 are detected by the receiver 28. For vibrations that contain the aforementioned distinctive attribute, the receiver 28 is configured and equipped to measure the residual intensity of the eligible vibrations, and then relay a signal to a remote communicator 40 reporting the assigned value of the intensity. Preferably, the remote communicator 40 is equipped and configured to receive and process a wireless signal, and then portray the intensity value of the detected vibrations through at least one human sensory mode. It should be noted that although wireless communication between receiver 28 and remote communicator 40 is preferred and most practical, a wired connection is of course possible without departing from the spirit of this invention.

Human sensory modes are practically limited to the categories of sight, sound and touch. (The modes of taste and smell would be impractical to implement.) The human sensory mode of sight is implicated in FIGS. 2-4, where the remote communicator 40 is depicted in the form of a meter or gauge. Certainly, any type of screen device capably of visually displaying information (digital or analog) will fall within the category of sight-based communication modes. Sight-based communication modes may also include a simple beacon light 42 like that shown in the alternative embodiment of FIG. 8. The beacon light 42 can flash/strobe with a frequency proportional to the detected intensity value, or in another example can change colors in proportion to the detected intensity value, such as using the color spectrum ROYGBIV as a scale to indicate signal strength.

Figure 8:
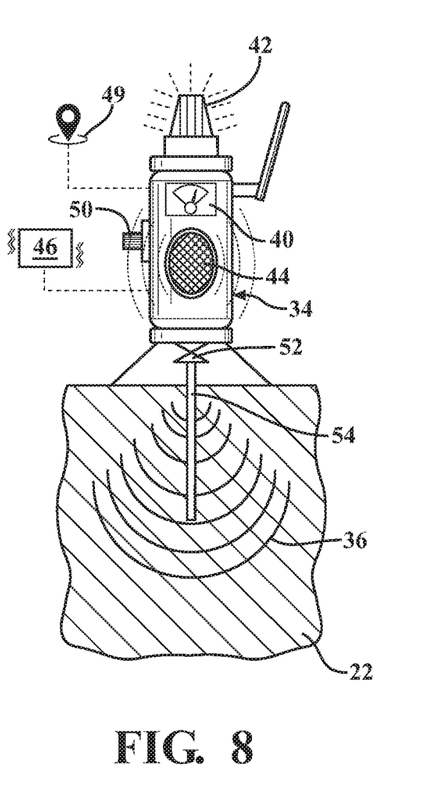
FIG. 8 is a view of the seismic generator according to one exemplary embodiment.

Sound-based communication modes are suggested in the alternative embodiment of FIG. 8, wherein the remote communicator 40 includes a speaker 44 that may be configured to produce audible sounds that increase in volume or tone or pitch with increases in signal strength, like in the example of a Geiger counter. Or the speaker 44 may be configured to play a pre-recorded message like "Vibrations detected having an intensity level three-point-five," or the like.

Touch-based communication modes are suggested in the alternative embodiment of FIG. 8, wherein the remote communicator 40 includes a haptic device 46 that may be configured to produce vibratory effects in the remote communicator 40. The frequency and/or intensity of such vibrations can be correlated to the intensity of the detected vibrations at the receiver 28. In this latter example, it is contemplated that the technician will be touching or holding the remote communicator 40 so as to feel the haptic sensations. Naturally, many output techniques are possible to communicate relative signal strength to the technician.

Figure 11A:
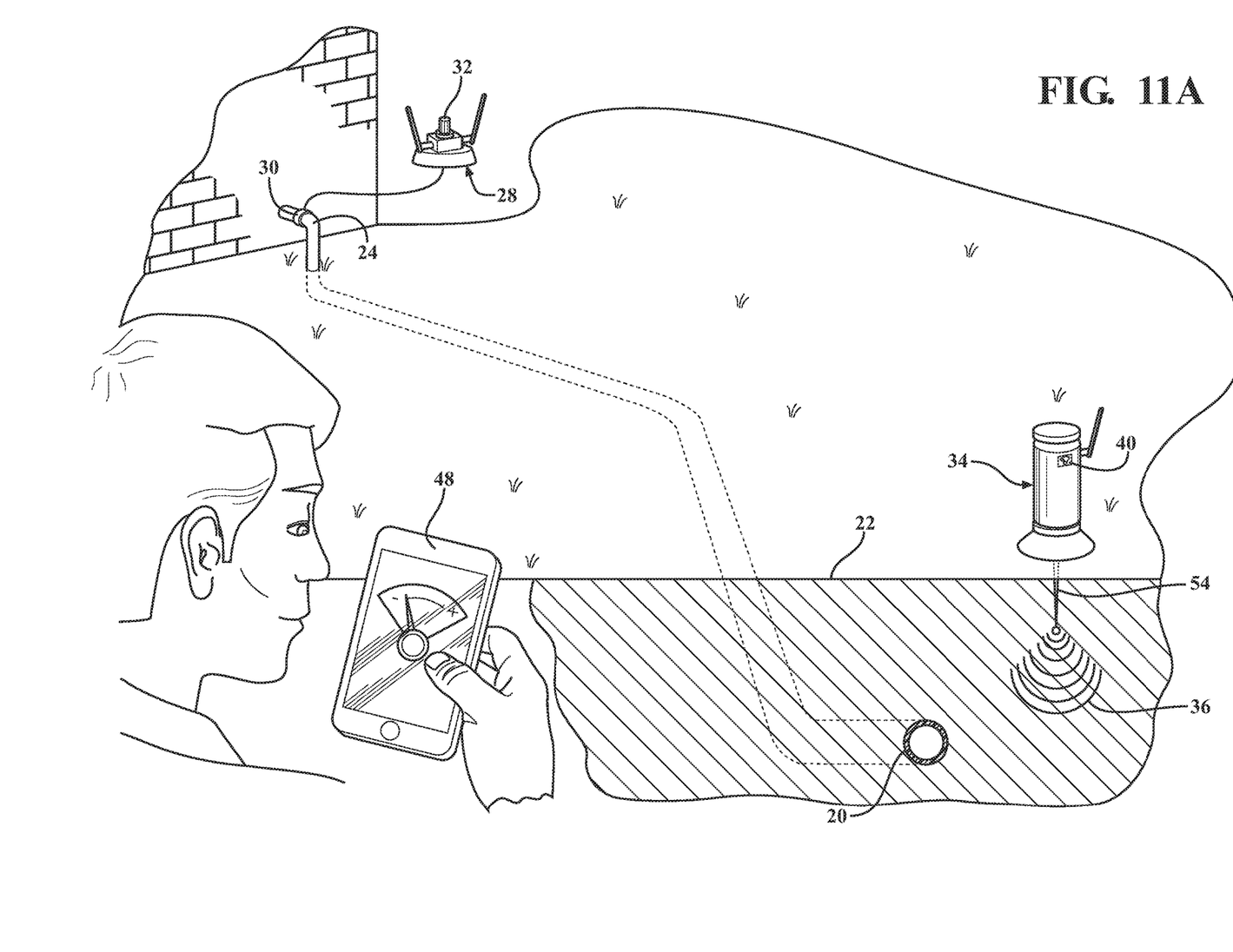
FIG. 11A is an environmental view showing the seismic generator placed in a first downrange sampling location slightly offset from the underground pipe and producing a relatively low intensity reading on an optional hand-held monitoring device.
Figure 11B:
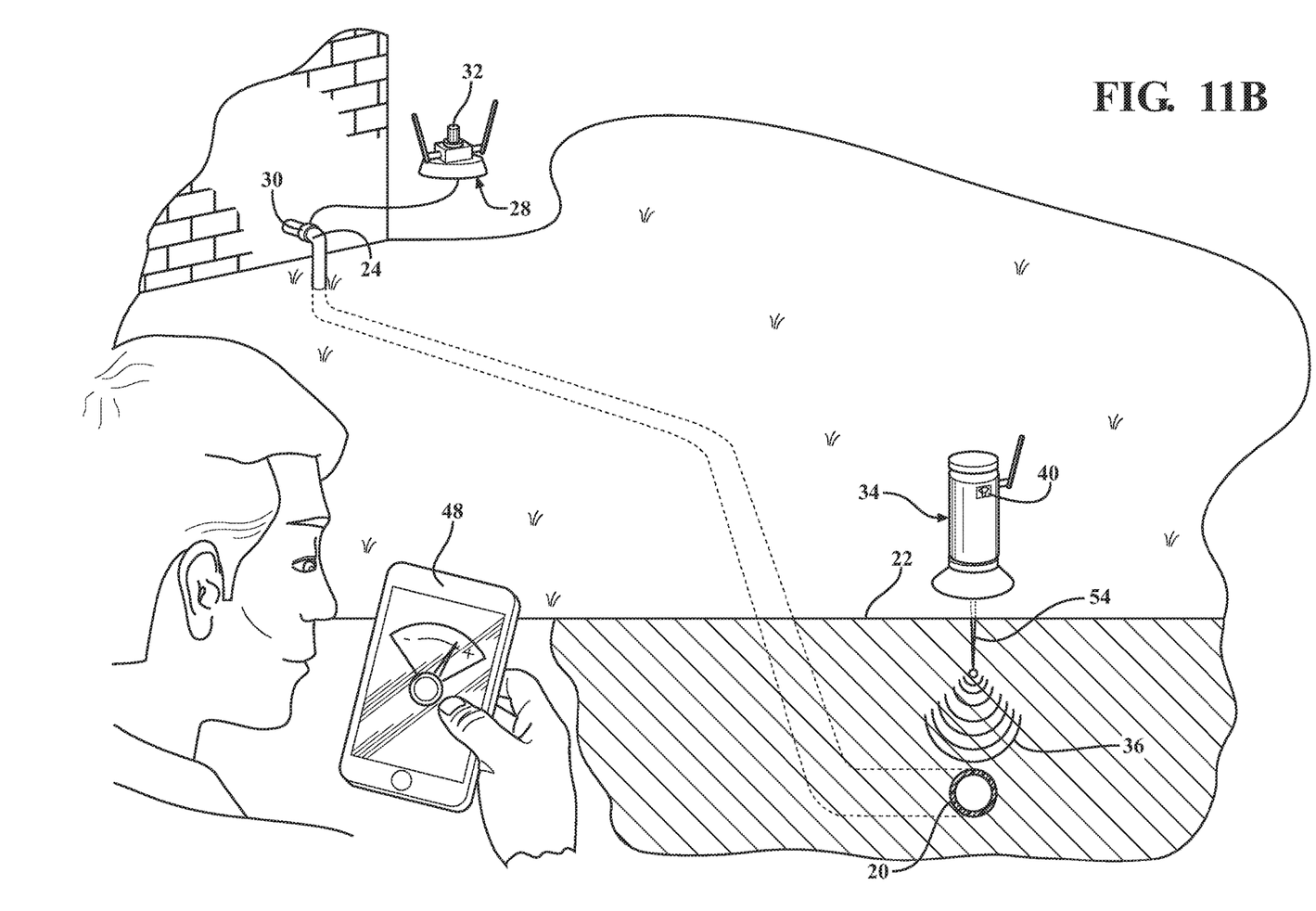
FIG. 11B is a view as in FIG. 11A but showing the seismic generator relocated to a second downrange sampling location that is directly over the underground pipe and produces a relatively high intensity reading on the optional hand-held monitoring device.

Throughout the figures, the remote communicator 44 is shown integrated into the housing of the seismic generator 34. This optional configuration is typically convenient for the technician so that a reading can be obtained shortly after the seismic generator 34 is placed and activated. If the remote communicator 40 issues a low intensity value reading, the technician may wish to quickly move to a new downrange sampling location. And so on until a satisfactorily high intensity value is reported and the technician concludes that no further readings are needed. In alternative contemplated embodiments, the remote communicator 44 could be tethered to the seismic generator 34 or completely detached. In the examples of FIGS. 11A and 11B, two remote communicators are shown, one in the form of a dial indicator 44 mounted on the housing of the seismic generator 34, and the other in the form of a suitable application-enabled smart phone device 48. This option could be particularly attractive when the seismic generator 34 is also equipped and configured with GPS capability 49 (FIG. 8) to couple instantaneous position data with the detected intensity data which may then be tabulated in the application perhaps together with cartographic data. In another example, not shown, an offsite remote communicator can receive intensity value data such as through a cellular communication network, which data is directly logged into a database. This latter option is also attractive when coupled with GPS capability 49. Many options are possible.

The seismic generator 34 preferably includes a selector device for modifying the distinctive attribute incorporated into the seismic waves 36. The selector device compliments the selector knob 32 of the transmitter 28, such that both allow a selection from among a plurality of distinctive attributes options. For illustrative purposes, the selector device is shown in the form of a dial 50 in FIG. 8 on the side of the seismic generator 34. If the distinctive attribute is a specified frequency or frequency range, the dial 50 can be manipulated to change to a different frequency or range. If the distinctive attribute is an embedded digital pulse or signal, the dial 50 can be manipulated to change to a different digital signal. The dial 50 could also be configured to change from one mode of distinctive attribute to another, such as from a frequency attribute to a digital signal attribute and combinations thereof. The receiver 28 would be tuned to respond to the same distinctive attribute as the seismic generator 34. The depicted dial 50 is merely a representation for any suitable control device. Alternative contemplated examples include push buttons and touch screen interfaces, to name but two. Because the distinctive attribute is chosen by the technician, interference from outside sources can be minimized.

In use, the detected signal strength as measured at the receiver 28, and wirelessly relayed to the remote communicator 40, will be stronger/louder as the seismic generator 34 is moved closer to the vertical location of the pipe 20. The detected signal strength will decrease as the seismic generator 34 is moved out of a direct vertical location over the pipe 20, perpendicular to the path of the pipe 20. In other words, there is a direct correlation between detected signal strength and pipe 20 location. Using this phenomenon, the pipe 20 location can be very accurately determined (often within inches) by reference to the strength of the signal heard/felt by the remote communicator 40. This allows the technician to locate, within a narrow horizontal area, the path of the pipe 20.

However, a single data point is typically insufficient to validate the underground location of a pipe 20. Only by empirically sampling a plurality of locations with the seismic generator 34 can a reliable conclusion be drawn as to the most probable location of the pipe 20. For this reason, after the technician has obtained a reading from the remote communicator 40 with the seismic generator 34 at the first downrange sampling location, the technician will then select a second downrange sampling location that is spaced a short distance from the first downrange sampling location. Like before, the second downrange sampling location will also be selected based on an educated suspicion that the new location may more accurately overlie a remote buried section of the pipe 20. The seismic generator 34 is thus re-located to the second downrange sampling location, whereupon a second seismic wave 36 containing the distinctive attribute is transmitted into the earth 22. Importantly, each sampling must be performed using seismic waves 36 having equal intensity so that readings received at the remote communicator 40 will be indicative of proximity to the buried pipe 20.

As with the first or initial sampling location, at the second downrange sampling location (and all subsequent sampling locations) the seismic waves 36 produced by the generator 34 propagate through the earth 22 and eventually intersect the wall of the pipe 20 nearest to the point of generation, which was previously identified as the intercept point. At the intercept point, these seismic waves 36 are converted into longitudinal waves 38 and conducted through the wall of the pipe 20 and/or in the hollow interior of the pipe 20 and/or in any fluid medium contained inside the pipe 20. The longitudinal waves 38, still imprinted with the distinctive attribute, eventually reach the accessible region 24, where the coupling 30 of the receiver 28 picks up the vibrations. The receiver 28 assesses the strength/intensity of these vibrations, and transmits a signal containing information about the signal intensity to the remote communicator 40, which in turn produces a discernable report quantifying or qualifying the signal intensity.

Using this methodology, a technician attempting to locate a buried pipe 20 will compose a modest search pattern by moving the seismic generator 34 from one downrange sampling location to the next, perpendicularly across the suspected underground path of the pipe 20. Because the remote communicator 40 is located directly on or near the seismic generator 34, it is very efficient for the technician to take a series of readings and quickly triangulate the most probable location of the buried pipe 20, which will be associated with the sampling location that yielded the highest signal intensity value readings within the search group. That is to say, the location of the intercept point relative to the downrange sampling location can be accurately predicted as a function of the vibration intensity value detected at the accessible region 24 of the pipe 20.

Figure 3:
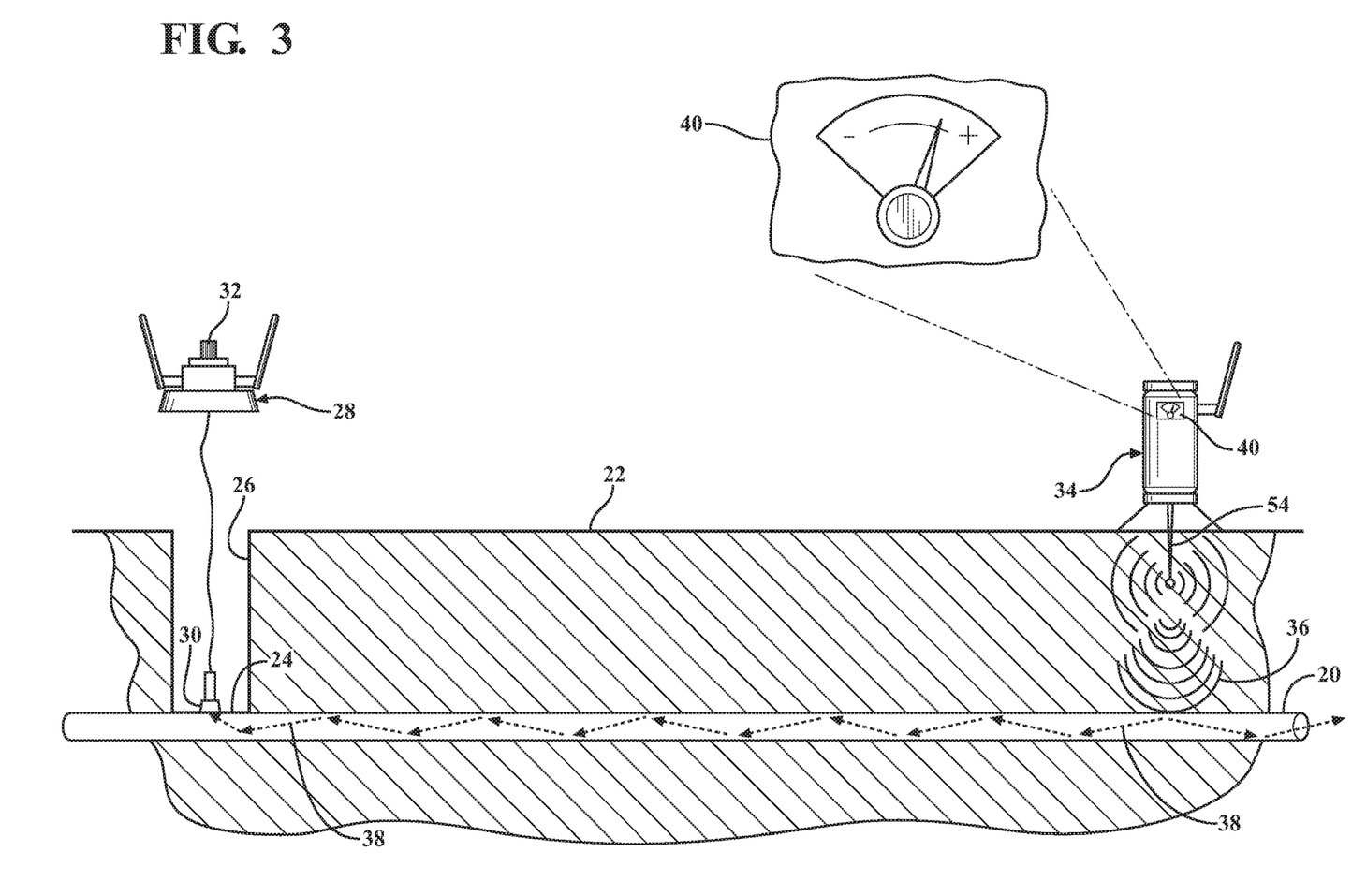
FIG. 3 is a schematic view as in FIG. 2, but showing an alternative configuration wherein the receiver is coupled to the accessible region of the pipe through an access tunnel.

When a technician is first dispatched to a new location, they will attempt to connect the receiver 28 to an accessible region 24 of the pipe. In the example of FIG. 2, the accessible region 24 is the riser section of the pipe 20 as it emanates from the earth 22. In the example of FIG. 3, the accessible region 24 is exposed through a man-hole 26 or access tunnel or the like. In the example of FIG. 4, the accessible region 24' is a known section of pipe 20 that must be registered through a ground spike coupling 30'. In each instance, the accessible region 24, 24' represents a known location of the buried pipe 20. Next, the technician devises a search pattern to determine the underground path of the pipe 20. The approach may include sequentially placing the seismic generator 34 at regularly spaced intervals in an arc generally centered at the location of the receiver 28. Each placement of the seismic generator 34 represents a different downrange sampling location. Naturally, the technician will decide the interval spacing and the number of sampling locations required by a given situation. By moving the seismic generator 34 in a semi-circle, taking readings (via remote communicator 40) at each sampling location, the direction (i.e., general trajectory) of the pipe 20 can be determined with a high degree of confidence. Extrapolating this trajectory, the operator devices a new search pattern further down range. The search can be continued in like fashion taking more distant readings to locate the pipe 20 further down field. In this manner, the systems and methods of this invention enable a technician to accurately locate buried pipes 20 of all types, on a repeatable basis, using relatively low-cost and easily transported equipment, in a time-efficient manner. By comparing the vibration intensity value produced by the longitudinal waves 38 from multiple sampling events clustered in a narrow region, the technician is able to determine that the pipe 20 is closest to the one particular downrange sampling location that is associated with the highest intensity value.

One might skeptically think that the present invention proposes to merely reverse the arrangement of transmitter and receiver components as taught in prior art systems like that depicted in FIG. 1. However, there is no valid comparison to the vastly superior results achieved by the teachings of the present invention. The inventor has discovered that the energy conversion rate from seismic waves 36 to longitudinal waves 38 is much higher/stronger than the reverse as practiced by prior art systems like that shown in FIG. 1. That is, the prior art (FIG. 1) converts longitudinal waves LW (in the pipe P) to seismic waves SW (in the soil), and then attempts to detect those seismic waves SW with a surface-based receiver R. However, in the prior art case the seismic waves SW emanating from the pipe P are so weak downrange, and considering the absorption effects of the intervening soil, that readings can barely be discerned at the receiver R, if at all. At distance "X" a signal intensity meter at the receiver R barely registers a signal. However, by reversing the arrangement of transmitter and receiver, the present invention has achieved altogether new results and surprisingly favorable improvements. Given the same distance "X" (see FIG. 2), the present invention will indicate a much stronger signal intensity, which in turn means more reliable and more repeatable findings. For reasons not entirely understood by the inventor from a scientific standpoint, the present invention realizes unexpectedly superior results by arranging components so that seismic waves 36 are converted to longitudinal waves 38 rather than the prior art methods where longitudinal waves LW (in the pipe P) are converted to seismic waves SW as shown in FIG. 1.

Considerable effort has been expended by the Applicant in attempts to scientifically describe why or how the present invention works as well as it does. Several theories have been advanced, any one or more of which may hold valid basis in fact. These theories are shared here below in good-faith effort to explain why the present invention produces astonishingly better results than any prior art systems. Nonetheless, it must be appreciated that other, or more nuanced, scientific explanations may in fact be responsible for the unpredictable good performance of this invention.

Prior art attempts, like those depicted in FIG. 1, have used the target pipe P to produce seismic waves SW. When a transmitter T is attached to the pipe P, longitudinal waves LW are produced in the pipe P. The longitudinal waves LW efficiently travel along the length of the pipe P, being conducted and reflected internally. The shape of the pipe P allows the longitudinal wave LW to retain most of its energy, however even that energy diminishes as a function of distance. Only relatively small fractions of the energy transfer, i.e., bleed out, into the surrounding soil. It can be said that the conversion efficiency of longitudinal waves LW to seismic waves SW is very low/poor. This could be due to the fact that most of the wave energy is reflected along the pipe P rather than escaping the pipe P through refraction. In terms of reflection and refraction, there is a critical angle, which is the minimum angle of incidence beyond which total internal reflection occurs. Any angle that is less than the critical angle will remain inside the pipe P, whereas any angle that is greater than the critical angle and 90° will leave the pipe P but at a refracted angle. And because the energy of the longitudinal wave LW diminishes over distance, the energy of the bleed-out seismic waves SW also diminishes with distance. This phenomenon is graphically represented in FIG. 1. Furthermore, it is noteworthy to observe that the energy of the bleed-out seismic waves SW will be distributed over a full circular (360°) pattern. Thus, only a tiny sector of the seismic waves SW is directed toward the receiver R. The small fraction of energy carried in the small sector of seismic wave SW travelling toward the receiver R is brutally absorbed the soil, resulting in an exceptionally weak signal that is difficult to detect. Thus, one distinguishing factor of prior art systems is that the seismic waves SW that travel through the earth are generated by the pipe P itself. These seismic waves SW are converted from longitudinal waves LW, which in turn are generated by the source transmitter T.

In contrast, the system and method of this present invention produce remarkably superior results. One distinguishing factor of the present invention is that the seismic waves SW that travel through the earth are generated by a seismic generator 34. Upon encountering the pipe P at an intercept point, the seismic waves 36 are converted to longitudinal waves 38. The conversion efficiency of seismic waves 36 to longitudinal waves 38 is comparatively good/high. As a direct result of this high conversion efficiency, more energy is transferred into the longitudinal waves 38, which in turn registers as greater intensity when detected at the receiver 28.

There are several theories attempting to explain this high conversion efficiency. In one theory, which may be better understood by reference to FIGS. 5 and 6, the seismic waves 36 are known to come into contact with the pipe 20 (i.e., at the intercept point) over some distance, causing multiple vibrations slightly offset in both time an locus. These multiple vibrations constructively interfere with one another (i.e., superpose) as they are conducted and reflected along the length of the pipe 20. Constructive interference amplifies the intensity of the propagating longitudinal waves, as described by the broken wave form in FIG. 6, which in turn improves the intensity detected at the receiver 28 in distant contact with the pipe 20 (or in close proximity to the pipe 20 as in the example of FIG. 4). In this manner, the intensity of the longitudinal waves 38 are magnified via constructive interference (superposition) as they are conducted along the pipe 20. This magnified intensity is also benefited by soil impedance which weakens the seismic wave 36 substantially, thus having a pronounced (non-linear) weakening effect on detected intensity as the sampling location is moved laterally away from a plane directly over the pipe 20. This in turn allows a good degree of accuracy when marking the pipe 20 path.

The magnified intensity of the longitudinal wave 38 may also be benefited by the fluid (liquid or gas) contents inside the pipe 20. In such fluids, the longitudinal waves 38 can create a companion compression wave that travels through the encased fluid. This compression wave is more beneficial in some mediums than others. Water has, for example, a density of 0.998 at a given temperature whereas Methane has a density of 0.717. Density and elasticity of the medium are factors that affect whether or not a compression wave benefits the detection capabilities of the receiver 28.

Figure 5:
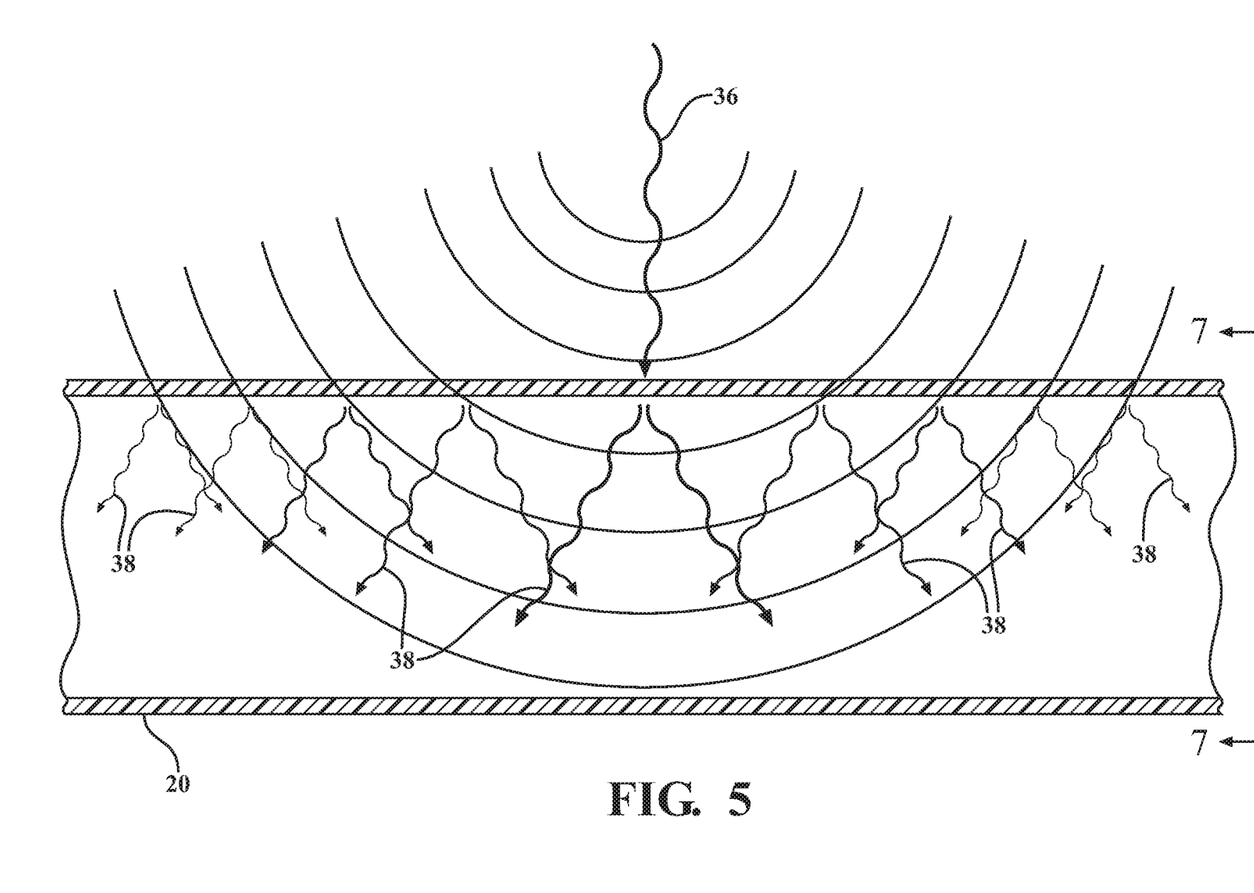
FIG. 5 is a fragmentary view showing an underground intercept point of the pipe in cross-section with seismic waves converting to longitudinal waves.
Figure 6:
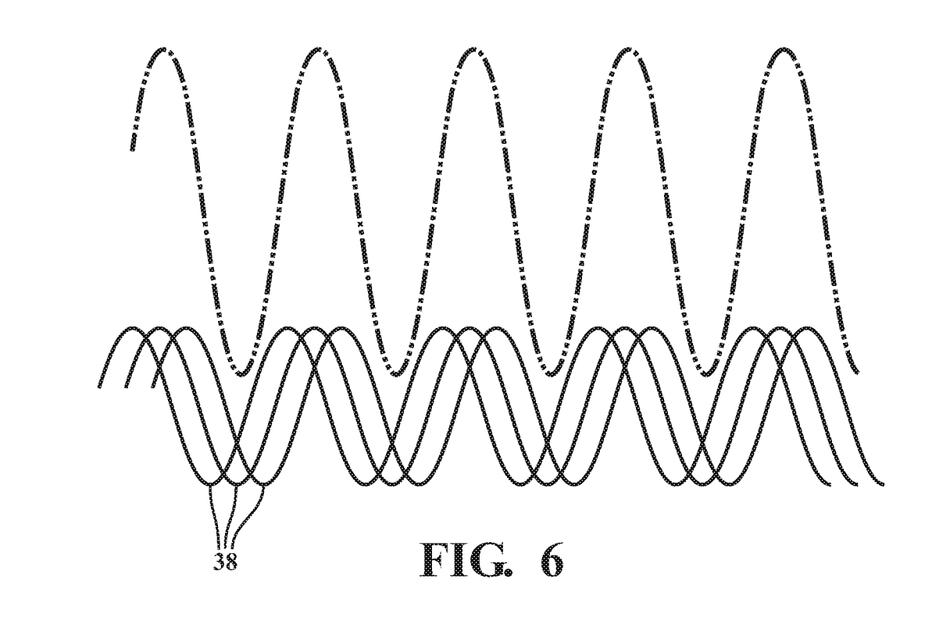
FIG. 6 is a simplified depiction of longitudinal waves being magnified through the action of constructive interference.
Figure 7:
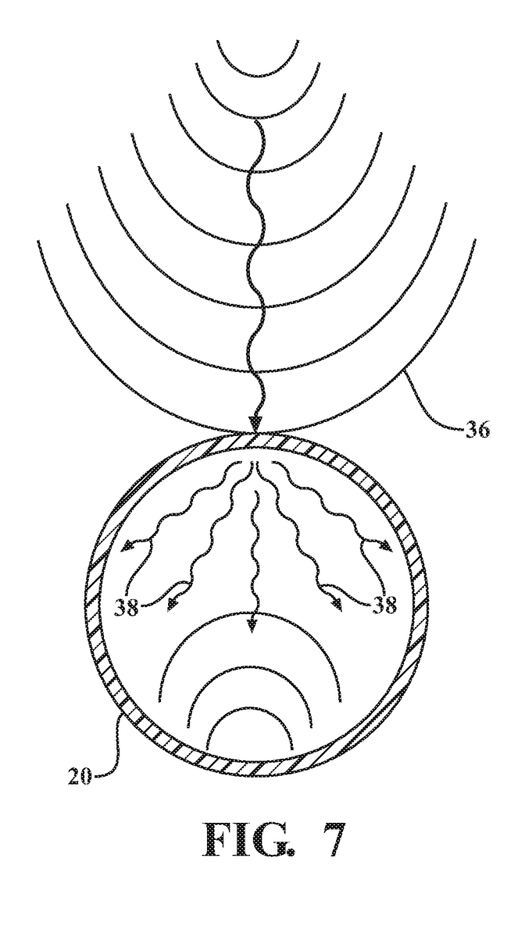
FIG. 7 is a cross-section of the pipe as taken generally along lines 7-7 in FIG. 5 and showing seismic waves converting to longitudinal waves with the benefit of internal reflection.

In another theory attempting to explain why the present invention produces such favorable results compared with the prior art, reference is made to FIG. 7 which is a simplified cross-section taken from FIG. 5. In this case, the theory of internal reflection is brought to bear. It is believed that the intensity of the longitudinal waves 38 is magnified also by way of the shape of the leeward side interior of the pipe 20 behaving in some respects like a trough reflector. Seismic waves 36 encounter the pipe 20 at a critical angle and are refracted through the wall of the pipe 20, entering the interior at a refracted angle. The refracted angle is likely to be lower than the critical angle and thus reflected internally. This trapping effect is favorably compounded by the concave shape of the leeward side interior of the pipe 20. Parabolic trough reflectors are well-known in solar thermal collection applications. By extension of the theory, the concave leeward interior of the pipe 20 may behave something like a trough reflector, helping to magnify the intensity of the longitudinal waves 38. This, combined with previously phenomenon of constructive interference (superposition), may greatly contribute to the comparatively good/high conversion efficiency of seismic waves 36 to longitudinal waves 38 that characterize the present invention.

Yet another theory supporting the astonishing success of the present invention contemplates the concentration of energy in a seismic wave 36 produced by the present invention as compared with the diffusion of energy in a seismic wave SW produced by the prior art. When the seismic generator 34 of the present invention produces seismic waves 36, all of the energy in concentrated over a downwardly-directed conical or hemispherical volume. The sector of that volume coming into contact with the pipe 20 will contain a relatively high concentration of energy, thus increasing the opportunity for energy conversion to longitudinal waves 38. In comparison, the prior art uses the pipe P to generate seismic waves SW. All of the energy in the seismic waves SW is diffused radially-outwardly in every direction (360°). The tiny sliver of a sector of emanating seismic wave SW has the opportunity to come into contact with the pipe P, which will then only contain a small, fractional concentration of energy. The receiver R will strain to detect this small signal emanating from the buried pipe P, especially when the soil conditions are less favorable.

A variation of the preceding theory considers the vector imbalance at the point of conversion from seismic waves 36 to longitudinal waves 38 produced by the present invention as compared with the vector balance at the point of conversion from longitudinal waves LW to seismic waves SW produced by the prior art. For the present invention, seismic waves 36 come into contact with the pipe 20 on one side (predominantly the top side), which a leeward side is effectively in the "shadow" of the seismic waves 36. All of the wave pressure is thus exerted non-uniformly on the wall of the pipe 20, which facilitates an imbalanced elastic response in the pipe 20. As a result, the seismic waves 36 are readily converted to longitudinal waves 38. In comparison, the prior art uses the pipe P to generate seismic waves SW. All of the energy in the seismic waves SW is diffused radially-outwardly in every direction (360°). To some degree, the forces vectored in opposite directions cancel one another, resulting in very little energy emanating into seismic waves SW which are therefore very difficult for the receiver R to detect.

As stated above, these explanations have been offered in good faith as possible reasons why and how the present invention is so astonishingly superior to the comparable prior art approaches. Any one or more of these theories may contribute to the success of the present invention. Of course, other theories may yet be advanced to explain why the present invention produces much better results than any prior art systems.

Figure 9:
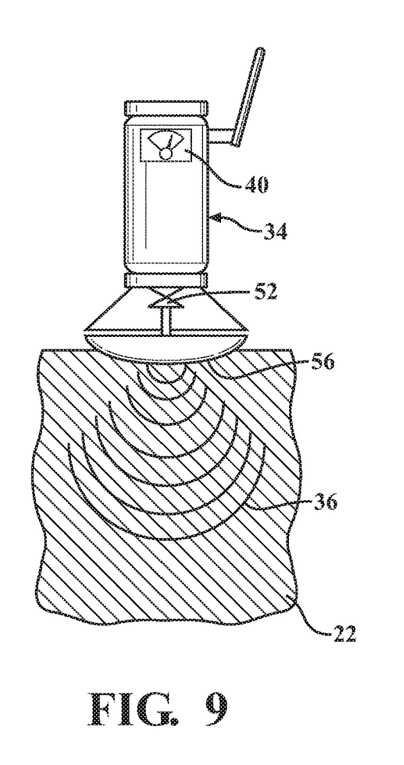
FIG. 9 is a view of the seismic generator according to another exemplary embodiment.
Figure 10:
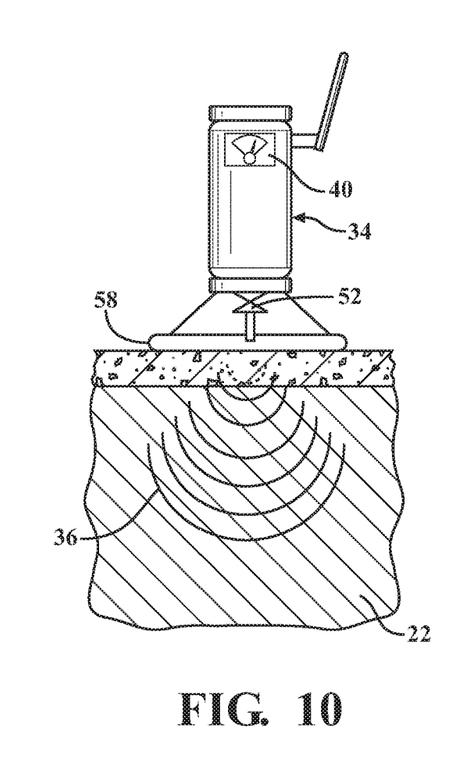
FIG. 10 is a view of the seismic generator according to a further exemplary embodiment.

Those of skill in the art will appreciate that the ability of the seismic generator 34 to create efficacious seismic waves 36 plays a significant role in the resultant intensity of vibrations detected by the remotely-located receiver 28. As depicted in FIGS. 8-10, the seismic generator 34 may be outfitted with a quick-connect coupling 52 to facilitate interchangeable ground interface implements to selectively increase the effectiveness of the seismic waves 36 depending on the surface/soil conditions at the downrange sampling location. FIGS. 2-4, 8 and 11A-B, for example, depict the use of ground interface in the form of a spike 54 that extends into the earth 22. Various lengths of spikes 54 may be carried by the technician in a kit, and rapidly installed via the quick-connect coupling 52. In some soil conditions, a very long spike 54 may be used to produce the most effective seismic waves 36. In other soil conditions, a short spike 54 may be warranted. Particularly hard soil conditions, e.g., compacted clay, may be unsuitable for a spike 54 of any length. In these cases, the seismic generator 34 can be fitted with a ground interface in the form of a directional speaker 56 to focus sound/vibration penetration into the earth, as illustrated in FIG. 9. For especially hard surfaces like paved parking lots and roadways, it may be useful to utilize a ground interface in the form of a contact plate 58, as shown in FIG. 10. These and various other ground interface implements schemes may be devised for different depth and soil types as may be indicated by the local field conditions, and conveniently interchanged via the quick-connect coupling 52.

In all embodiments, this present invention provides systems and methods with which a utility owner, an excavation contractor or a locating contractor can easily find buried pipes 20 of all kinds, including but not limited to non-metallic types such as PVC (plastic), clay and concrete (asbestos concrete, PCCP, etc.). Such non-metallic pipes have historically been difficult to locate except by using ground penetrating radar (GPR) which only works in limited soil types, or by measurements from blueprints (disregarding scientifically questionable methods like dowsing/witching rods). This invention provides a reliable, repeatable method that is easy to use and works on most if not all types of pipes 20 and generally regardless of contents or whether the pipe is under pressure or not. The methods of this invention do not require access to the inside of the pipe, enabling pipes 20 carrying pressurized gas and water to be located without endangering the technician or disrupting service to customers connected to the pipe 20.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

What is claimed is:

1. A non-invasive method for locating a remote section of a pipe buried in the earth, said method comprising the steps of:
   coupling a receiver to an accessible region of the pipe, the receiver being configured to detect the intensity of vibrations having at least one distinctive attribute,
   selecting a first downrange sampling location suspected to overlie a remote buried section of the pipe, transmitting seismic waves containing the distinctive attribute at a predetermined intensity into the earth at the first downrange sampling location, converting the seismic waves into first longitudinally propagating waves at an intercept point along the pipe nearest to the first downrange sampling location, the first longitudinal waves retaining the distinctive attribute, conducting the first longitudinal waves along the pipe toward the accessible region,
   selecting a second downrange sampling location spaced from the first downrange sampling location, transmitting seismic waves containing the distinctive attribute at the predetermined intensity into the earth at the second downrange sampling location, converting the seismic waves into second longitudinally propagating waves at an intercept point along the pipe nearest to the second downrange sampling location, the second longitudinal waves retaining the distinctive attribute, conducting the second longitudinal waves along the pipe toward the accessible region,
   detecting vibrations having the distinctive attribute in the pipe with the receiver, measuring the intensity of the detected vibrations, relaying a signal from the receiver to a remote communicator configured to portray the intensity of the detected vibrations through at least one human sensory mode,
   comparing the intensity value of the detected vibrations produced by the first longitudinal waves to the intensity value of the detected vibrations produced by the second longitudinal waves, and determining that the downrange sampling location associated with the highest intensity value is closest to the pipe.

2. The method of claim 1, wherein said transmitting step includes modifying at least one of the distinctive attribute and the intensity of the seismic waves.

3. The method of claim 1, wherein said conducting step including magnifying the intensity of the longitudinal waves via constructive interference.

4. The method of claim 1, including the step of displaying the intensity of the detected vibrations at the remote communicator through a human sensory mode selected from the group consisting essentially of visually, audibly and hapticly.

5. The method of claim 1, wherein said at least one distinctive attribute is a predetermined frequency range.

6. The method of claim 1, wherein said at least one distinctive attribute is a predetermined digital pulse.

7. The method of claim 1, wherein said transmitting step includes interchanging ground interfacing implements with a seismic generator.

8. The method of claim 1, wherein said transmitting step includes associating the geo-location of the downrange sampling location with the measured intensity of the detected vibrations.

* * * * *